Patented Dec. 28, 1948

2,457,229

UNITED STATES PATENT OFFICE 2,457,229

HIGH MOLECULAR WEIGHT PRODUCTS OF ETHYLENE

William E. Hanford, Easton, Pa., and John R. Roland, Wilmington, Del., assignors to E. I. du Pont de Nemours & Company, Wilmington, Del., a corporation of Delaware No Drawing. Original application January 1, 1943, Serial No. 471,028. Divided and this application June 13, 1946, Serial No. 676,578

6 Claims. (Cl. 260—614)

This invention relates to new types of products, called telomers, from ethylene and more particularly to telomers of ethylene with oxygenated organic compounds and to the process, telomerization, for their preparation.

A number of polymers of ethylene are known, such as, for example, those described in U. S. Patents 2,153,553; 2,388,225; 2,396,785; 2,395,327; and 2,396,677, all filed March 15, 1941. These are solid products with typically polymeric properties, such as ability to be formed into films and fibers. Other polymers of ethylene are oils, for example those polymers produced by acidic and metal halide catalysts. The oily polymers find use only in lubrication and related fields and the solid polymers have use in the plastic arts. For many applications, however, none of these polymers have the desired properties. Thus the solid ethylene polymers, even those of low molecular weight, are relatively insoluble, have poor solvent retention, and are incompatible with paraffin and other natural waxes. Furthermore, the low molecular weight polymers of this type are soft solids and the higher molecular weight products are tough, stringy, and coherent. In contrast the new ethylene telomers of this invention have a different chemical composition and show good solubility characteristics. They are compatible with paraffin and waxes over wide ranges of composition; they have high retention of solvents, especially wax solvents; they are extremely hard and form a continuous hard film without stringing or sticking, especially when laid down from a gelled composition containing solvent.

This application is a division of our U. S. Patent No. 2,402,137, filed January 1, 1943.

An object of this invention is to produce new products from ethylene. Another object is to produce telomers of ethylene, more specifically telomers of ethylene and oxygenated organic compounds. Yet another object is to provide a process for the preparation of telomers from ethylene and more particularly telomers from ethylene with oxygenated organic compounds. Other objects and advantages of the invention will appear hereinafter.

The novelty of the products of this invention and of the reaction by which they are formed is such that for a clear understanding a new set of terms has been coined. The reaction has been called "telomerization" (from the Greek telos, meaning "end" plus the Greek mer, meaning "part"). Telomerization is defined as the process of reacting, under polymerization conditions, a molecule YZ, which is called a "telogen," with more than one unit of a polymerizable compound having ethylene unsaturation, called a "taxogen," to form products called "telomers," having a new carbon to carbon bond and the formula $Y(A)_nZ$, wherein $(A)_n$ is a divalent radical formed from a plurality of taxogen molecules, the unit A being called "taxomon," $n$ being an integer greater than 1 and Y and Z being fragments of the telogen attached terminally to the chain of taxomons. Some telomerization reactions have been described in copending application Ser. No. 438,466, and now U. S. Patent 2,440,800.

Telomerization is not to be confused with interpolymerization. It is known, for example, that, under conditions similar to those described above, ethylene can be interpolymerized with a wide variety of unsaturated compounds. In such interpolymerizations a plurality of molecules of each reactant, the ethylene and the unsaturated compound, enter into the formation of every polymer chain, and the resulting product is a high molecular weight polymeric material containing recurring units of even species of reactants. In telomerization reactions, however, substantially one molecule of the telogen enters into reaction with the growing polymer chain, and the average molecular weight of the product is very much lower than that of an interpolymer or polymer formed under similar conditions. In most instances, telomerization leads to products comprised essentially of telomers of the above structure. However, depending upon the nature of the telogen and the reaction conditions, the products produced by the process of this invention sometimes appear to contain, on the average, less than one molecule of the telogen per polymer chain, but none contain more than one molecule of chemically combined telogen per molecule of the telomer. One explanation for this, which should not be construed as limiting the invention in any manner, is that the telomerization reaction is accomplished in some cases by a small amount of a side reaction which yields a relatively low molecular weight material, free of combined addenda of the telogen.

The objects of this invention have been accomplished by the discovery that ethylene can be telomerized with a saturated organic compound containing only carbon, hydrogen, and oxygen in the presence of a suitable telomerization catalyst. Generally speaking, the telomerization conditions include elevated temperatures, for example, from about 50° to 300° C., and the use of, preferably, a peroxygen-type catalyst. Telomerization catalysts are those which have been shown to yield free radicals and to be catalysts for the polymerization of ethylene and are more fully described hereafter. The present invention differs from solution polymerization of ethylene and from polymerization of ethylene in mixed aqueous-solvent media, in that the reaction medium, the telogen, reacts with the growing ethylene chains and in that the reaction is conducted in the substantial absence of water. Telomerization differs from polymerization in that, in the presence of this telogen, a new type of product which is chemically combined with the telogen is produced. In the absence of the telogen, peroxygen polymerization conditions result in the formation of a polymer.

The new telomers of this invention range from soft greases to hard waxes and all may be formed by heating ethylene and a saturated organic compound containing only carbon, hydrogen and oxygen in the presence of a peroxygen-type catalyst under superatmospheric pressure. The saturated organic compound used as telogen may be an alcohol, aldehyde, ketone, acid, ester, acid anhydride, ether or acetal.

Since ethylene is normally a gas, the process of this invention requires means for compressing ethylene, pressure resistant reaction vessels and means for heating and agitating the reaction mixture. Preferably, means are also provided for deoxygenating ethylene and, for continuous operation, suitable pumps and metering devices for controlling rates of addition of various reactants. The reaction may be operated as a batch process, a semi-continuous process or a continuous process. The following discussion illustrates one manner of carrying out batchwise operation of the reaction.

A pressure-resistant reaction vessel is charged with a peroxide catalyst and the desired telogen. If desired the telogen may be diluted with an inert solvent, preferably a saturated hydrocarbon, or secondly a less active telogen. This charging operation is preferably carried out in a nitrogen or other inert atmosphere. The vessel is closed, evacuated to remove residual air, placed in a shaker machine provided with a heater, connected to a source of high pressure ethylene and controlling and recording thermocouples placed in position. The valve to the vessel is opened and the vessel pressured with ethylene. Heating and agitation are started and, on reaching the selected reaction temperature, the reaction starts. Induction periods, often observed with polymerization reactions, are not common in telomerizations but when observed, they are generally very short. The course of the reaction may be followed by pressure drop due to the utilization of ethylene. The pressure is generally maintained in a selected range throughout the reaction by the periodic addition of fresh ethylene. The end point of the reaction is marked by cessation of pressure drop and then the vessel is cooled, bled of excess ethylene, opened and the reaction mixture discharged. The isolation of the products is easily accomplished by methods shown in the examples or by simple modifications readily apparent to one skilled in the art.

The following examples illustrate the breadth of the invention, show types of organic compounds which are active as telogens and demonstrate suitable conditions for operation. All parts are by weight unless otherwise stated.

*Example 1.*—A stainless steel-lined high pressure reaction vessel is charged with 100 parts of 1,4-dioxane and 0.2 part of benzoyl peroxide. The vessel is closed, evacuated to remove residual air, placed in a shaker machine, pressured with ethylene and heating and agitation are started. During a reaction time of 16.25 hours throughout which the temperature is maintained at 75–81° C. (except for momentary surges to 105° C. and 94° C.) and the pressure at 650–950 atmospheres, there is a total observed pressure drop of 485 atmospheres. The vessel is cooled, bled of excess ethylene, opened and the contents discharged. This reaction mixture yields 27 parts of a hard wax which melts to a syrupy fluid at 120° C. This wax has an intrinsic viscosity of 0.25 (as measured on a ½% solution in xylene at 85° C.) and contains 84.27% carbon and 13.72% hydrogen. From this analysis it may be calculated that the wax has an ethylene/1,4-dioxane mole ratio of 54:1.

*Example 2.*—A stainless steel-lined high pressure reaction vessel is charged with 100 parts of 1,3-dioxolane. The remaining space of the reaction vessel is filled with air in which there is 0.05% of oxygen, as calculated on the amount of ethylene introduced. The vessel is closed, placed in a shaker machine, pressured with ethylene and heating and agitation are started. During a reaction time of 9 hours throughout which the temperature is maintained at 172–176° C., (except for one brief surge to 198° C.) and the pressure at 855–915 atmospheres, there is a total observed pressure drop of 460 atmospheres. The vessel is cooled, bled of excess ethylene, opened and the contents discharged. This reaction mixture yields 42.5 parts of ethylene/1,3-dioxolane wax which melts at 95° C. after prior softening at 45° C. This wax is a stiff grease rather like lanolin though somewhat stiffer and more coherent. The wax contains 81.65% carbon and 13.71% hydrogen from which it may be calculated that the mole ratio of ethylene to dioxolane is 22:1. This corresponds to a molecular weight of 690 which is in good agreement with the observed molecular weight of 775 as determined ebulloscopically. This type of wax is admirably suited for use as a drawing lubricant in the drawing of metals and may also be used as a lanolin substitute in cosmetics and pharmaceuticals.

*Example 3.*—A stainless steel-lined high pressure reaction vessel is charged with 100 parts of 1,3-dioxolane and 0.2 part of hydrazine sulfate. The vessel is closed, evacuated to remove residual air, placed in a shaker machine, pressured with ethylene and heating and agitation are started. During a reaction time of 15.5 hours, throughout which the temperature is maintained at 223–238° C. and the pressure at 840–930 atmospheres, there is a total observed pressure drop of 130 atmospheres. The vessel is cooled, bled of excess ethylene, opened and the contents discharged. This reaction mixture yields 42 parts of soft wax which melts at 90° C. after prior softening of 40–50° C. This wax is found (ebulloscopically) to have a molecular weight of 625. This wax closely resembles that illustrated in Example 2.

*Example 4.*—A stainless steel-lined high pressure reaction vessel is charged with 100 parts of ethylal and 0.3 part by volume of diethyl peroxide. The vessel is closed, evacuated, placed in a shaker machine, pressured with ethylene and heating and agitation are started. During a reaction time of 16.75 hours, throughout which temperature is maintained at 130–145° C. and the pressure at 500–950 atmospheres, there is a total observed pressure drop of 605 atmospheres. The vessel is cooled, bled of excess ethylene, opened and the contents discharged. This reaction mixture yields 52 parts of wax which melts at 100–102° C. The intrinsic viscosity of this wax is 0.15 (as measured on a ½% solution in xylene at 85° C.). This wax contains 1.72% ethoxyl which corresponds to a molecular weight of about 5000.

*Example 5.*—A stainless steel-lined high pressure reaction vessel is charged with 100 parts of 1,3-dioxolane which has been blown with air until the peroxide content (as measured by liberation of iodine from potassium iodide) attains 0.18 per cent. The vessel is closed, evacuated to remove residual air, placed in a shaker machine, pressured with ethylene, and heating and agitation are started. During a reaction time of 17.5 hours throughout which the temperature is maintained at 79–82° C. and the pressure at 805–910 atmospheres, there is a total observed pressure drop of 215 atmospheres. The vessel is cooled, bled of excess ethylene, opened and the contents discharged. This reaction mixture yields 26 parts of ethylene/1,3-dioxolane wax which melts at 113–115° C. and has an intrinsic viscosity of 0.09 (as measured on a ½% solution in xylene at 85° C.). Proximate analysis of the wax shows the wax to contain 83.41% carbon and 14.22% hydrogen from which it may be calculated that the product has an ethylene/dioxolane mole ratio of 46:1.

*Example 6.*—A stainless steel-lined high pressure vessel is charged with 100 parts of 1,3-dioxolane, 0.5 part of sodium persulfate and one part of sodium tetraborate. The vessel is closed, evacuated to remove residual air, placed in a shaker machine, pressured with ethylene, and heating and agitation are started. During a reaction time of 17.25 hours throughout which the temperature is maintained at 79–81° C. and the pressure at 860–950 atmospheres, there is a total observed pressure drop of 225 atmospheres. The vessel is cooled, bled of excess ethylene, opened and the contents discharged. This reaction mixture yields 8 parts of ethylene/dioxolane which melts at 116 to 117° C.

*Example 7.*—A stainless steel-lined high pressure reaction vessel is charged with 100 parts anhydrous diethyl ether and 0.2 part of benzoyl peroxide. The vessel is closed, evacuated to remove residual air, placed in a shaker machine and pressured with ethylene. Heating and agitation are started, and during a reaction time of 17 hours, throughout which the temperature is maintained at 78–82° C. and the pressure at 875–990 atmospheres, there is a total observed drop of 210 atmospheres. The vessel is cooled, bled of excess ethylene, opened and the contents discharged. The reaction mixture yields 9 parts of ethylene/diethylether telomer. The product melts at 116–118° C., has an intrinsic viscosity of 0.11 (as measured on a ½% solution in xylene at 85° C.) and contains 0.63% ethoxyl.

It has been stated that products of this invention are telomers of ethylene with saturated organic compounds containing only carbon, hydrogen and oxygen and that they are believed to have the structure $H(C_2H_4)_nR$, wherein H is abstracted from the telogen and R is the residue of said telogen. Whether this suggested structure is correct in all details is not entirely certain but as is adequately shown by the examples, the products contain chemically bound fragments of the telogen and the functional groups of these fragments can be determined by standard analytical methods. In this respect particularly and in physical properties generally, the new telomers of this invention differ from mere low molecular weight polymers of ethylene. Nevertheless, whatever the mechanism by which such telomers are formed or whatever their structure, the description of the products is adequate and the process for their preparation is sufficiently well illustrated that no limitations of theory are imposed on the invention. The next paragraph defining the classes of saturated organic compounds which act as telogens, possibly gives a clearer picture of the nature of the products.

The telogens employed as reaction media and as reactants in this invention are saturated organic compounds containing only carbon, hydrogen and oxygen. By saturated organic compounds is meant any compound which is free of olefinic unsaturation and is meant to exclude such polymerizable compounds as vinyl esters, acrylic esters, and other derivatives of acrylic acids. Suitable classes of this type of telogen are saturated alcohols, ethers, acids, esters, anhydrides, aldehydes, ketones and acetals. Preferred compounds for use as telogens in this invention can be represented by the formula ROR', wherein R and R' are free of olefinic unsaturation, may be alike or different, and may be alkyl, aryl, aralkyl, alkaryl, acyl, or the group

in which R'', R''', and R'''' are free of olefinic unsaturation, may be alike or different, may be alkyl, aryl, aralkyl, or alkaryl, and R'' and R''' may be hydrogen. Preferred classes of compounds coming within the scope of this formula are ethers, esters, anhydrides, and acetals. Acetal is used in its broadest sense and includes the subgroups of formals and ketals. These telogens herein employed in general are relatively less reactive than other telomerizing agents, as, e. g., the polyhalomethanes. For this reason, the molecular weight of telomers from polyhalomethanes prepared under comparable conditions, in general, would be much lower.

Telomerization reactions, like peroxide catalyzed polymerizations, are highly sensitive to traces of impurities or inhibitors. Because of this and because of the wide variety of sources of these classes of compounds, it is especially desirable that the compounds be prepared or specially purified to rigid requirements. For example, some acetals, though boiling at the correct temperature, have been found to show no reaction with ethylene, whereas the same acetal carefully purified, e. g., by redistillation from sodium or hydroquinone in a nitrogen atmosphere, will give high yields of ethylene/acetal wax. Similarly, it is preferable that esters be carefully purified. One convenient method is by distilling an ester of normal purity from about 2% by weight of phosphorus pentoxide. Other types of telogens are preferably purified by approximate methods which are well known and widely described.

Inasmuch as it is not convenient or feasible to weigh accurately the ethylene used in these reactions, the ratio of telogen to ethylene is best expressed as a ratio of weight to volume; for example, in most of the examples the amount of telogen ranges from 50 to 200 parts and, in the reactor employed the remainder of the reaction space of from 250 to 200 volumes is occupied by ethylene under the conditions of temperature and pressure prevailing. Ordinarily, this volume of ethylene amounts to from 100 to 200 parts by weight. Preferred limits of ratios of telogen to ethylene thus range from 1:2 to 2:1, expressed by weight, though ratios outside this, e. g. from 1:5 to 50:1 are operable. Wax-like products from such telogens as ethers and esters have, on a molar basis, a ratio of telogen to ethylene of 1 to 20, and generally from 1 to 30, although the ethylene chain may be considerably longer.

The telogen is preferably used in its purest form and in the absence of other solvents or diluents. However, small amounts of pure water, e. g. up to 10% by weight based on the telogen, do not appreciably hinder the reaction. Likewise, a liquid organic solvents may be used to dilute the telogen. For this, saturated aliphatic hydrocarbons and aromatic hydrocarbons are preferred, such as iso-octane, cyclohexane, n-hexane, and benzene, though other compounds, e. g. a less reactive telogen, may be used.

This telomerization reaction is generally applicable to ethylene. However, small amounts of a second polymerizable organic compound containing an ethylenic unsaturation may be included to modify the properties of the telomer. For this not more than about 10 mole per cent, based on the ethylene of a vinyl or vinylidene compound may be used.

The telomerization reaction between ethylene and the above-defined telogens does not occur in the absence of a telomerization catalyst. The catalysts used in the process of this invention are agents which are effective as catalysts for the polymerization of ethylene and which are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of vinyl compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, the following suitable telomerization catalysts may be employed: diacyl peroxides, such as diacetyl peroxide, diproprionyl peroxide, dibutyryl peroxide, dilauroyl peroxide, acetyl benzoyl peroxide, and dibenzoyl peroxide; dialkyl peroxides such as diethyl peroxide; other peroxides, such as acetal peroxides; alkali metal and ammonium persulfates, perborates and percarbonates; oxygen, if used in small quantities, say not to exceed 0.1%; all of the aforesaid catalysts being herein referred to as peroxygen-type catalysts; also, hydrazine derivatives, such as hydrazine sulfate, hydrazine hydrochloride and dibenzoyl hydrazine; perhalogen compounds such as hexa- chlorethane; organometallic compounds such as tetraethyl-lead and other organometallic compounds which decompose thermally to yield free radicals; ultraviolet light in the presence of photosensitizers such as diacetyl, mercury, alkyl iodides and acetone. Along with a persulfate or a perchlor catalyst, it is generally preferable to use an alkaline acting inorganic compound which, in an aqueous system, would act as a buffer; such as, sodium tetraborate, secondary alkali metal phosphates and alkali metal carbonates.

The temperatures employed in the practice of this invention may vary over a wide range. The temperature to be employed will depend to a large degree on other conditions. Temperature is most critically dependent on the nature of the catalyst, for example, diacyl peroxides and persulfates generally operate best in a temperature range from 50 to 150° C. Oxygen, hexachloroethane and hydrazine compounds generally require considerably elevated temperatures, e. g. from 130 to 250° C. Diethyl peroxide is intermediate and preferably operates in a temperature range from 100 to 200° C. The temperature chosen for carrying out this telomerization is to some extent dependent on the nature of the telogen. As shown by the examples, certain telogens such as methyl propionate and 1,3-dioxolane are extremely reactive and may lead to difficultly controllable temperature surges during the initial stages of the reaction. In other cases the telogen is much less reactive and under the same conditions of temperature reacts sluggishly. In order to offset this the temperature is conveniently raised.

Since ethylene is a gas, its telomerization reactions are carried out under superatmospheric pressure. In order to attain a high yield and a high space-time yield these reactions are generally carried out at pressure above 3 atmospheres. The preferred pressure range is from about 400 to 1000 atmospheres. The latter figure should not be taken as an absolute upper limit since this is determined solely by the strength of available equipment. Operation at higher pressures is possible and for high rates of reaction highly desirable. Pressure is a variable which is dependent to some degree on the temperature; thus at high temperatures a relatively rapid rate of reaction may be attained at low pressure, while at low to intermediate temperatures more elevated pressures are necessary to attain the same rate of reaction.

As has been pointed out before, telomerization reactions are extremely sensitive to impurities. For this reason the ethylene used should be of the highest purity practical. Small amounts of methane, ethane, propane, nitrogen, hydrogen, carbon dioxide and oxygen are tolerable. Small amounts of the first six of these have negligible effect on telomerization reactions. However, the oxygen concentration is highly critical, inasmuch as large amounts of oxygen completely inhibit peroxide catalyzed telomerization reactions at relatively low temperatures when it is present to the extent of more than 0.1% by weight. In order to reduce the oxygen concentration of ethylene to below this figure commercial ethylene is deoxygenated, for example, by passage over hot copper or by scrubbing with a strong reducing agent. Oxygen can, however, act as a catalyst as shown above, if its concentration is quite small, e. g. below 0.1% and preferably below 0.075%. The activity of oxygen as a catalyst is only apparent at relatively elevated temperatures, for example, above 150° C. and preferably from 150 to 250° C.

In the practice of this invention all equipment which comes in actual contact with the polymerization system is preferably fabricated of or lined with materials which do not rapidly catalyze the decomposition of peroxide to molecular oxygen. Suitable examples of such materials are stainless steels, silver, lead, tin, aluminum, enamel and glass.

A continuous process offers obvious advantages, especially for commercial or semi-technical scales of operation. Among the chief of these is the ease of control of reaction conditions for these highly exothermic reactions. In telomerization by a continuous process the time of contact may be readily controlled and thus the rate of removal of the heat of reaction and temperature are easily controlled. The high space-time yield of continuous operation again makes it highly preferred for large scale operation. Continuous processes for telomerization of ethylene described in this invention may take any of several forms. For example, the mixture of ethylene, peroxide catalyst and telogen may be pumped through a tubular reactor, a portion of which is heated to the desired temperature. The ethylene may be bubbled through a solution of the catalyst in the desired telogen with continuous removal of the product and simultaneous replacement of fresh telogen solution of catalyst or the ethylene and telogen may be pumped separately, mixed, and then passed through a reaction zone. Alternatively, the mixture of ethylene and telogen can be pumped through a system into which, at various intervals, is injected a solution of the catalyst.

For the best results in the practice of this invention it is generally desirable to agitate the reactants. This is meant to include any means for obtaining intimate contact of all reactants such as by vigorous shaking of the whole reaction system, stirring as in an autoclave type reactor, or by efficient bubbling of the gaseous phase of the system through the liquid phase or by turbulent flow of a gas-liquid system.

The telomers comprising this invention have found large numbers of uses. The most important are those hard waxy telomers like ethylene/methyl propionate and ethylene/ether waxes which have been found to be extremely promising substitutes for carnauba and other natural waxes. Thus, these have been found excellent for use in paste polishes, emulsion polishes, in which the carnauba wax of the polish formula is replaced by the telomer. These have been found to be excellent for preparation of automobile polish, floor paste polish, for shoe polishes, for emulsion floor polishes. These have also been found to have lubricating action and to be of use for drawing metals, as a bullet lubricant, as a modifier for lubricating oils. Most of the waxes comprising this invention are extremely hard. Many are found to be as hard or harder than the best grades of carnauba wax. This makes the material a desirable substitute for use as a hardening agent for wax candles. Similarly, they have found use for molding Dictaphone records and as wax in carbon paper inks. Water-repellent properties of natural wax are duplicated in these new telomers and they are thus found useful in moisture-proofing paper and fabrics. These have been used for paper coating and impregnation, for textile finishes, for moisture-proofing paper and textiles, for coating paper by the melt method. Other uses are as a paper size, as a flatting agent for finishes, as an anti-flooding agent for enamels.

We claim:

1. A process for the preparation of a dialkyl ether/ethylene reaction product which comprises heating under ethylene pressure above 200 atmospheres a dialkyl ether free of olefinic unsaturation and a peroxy catalyst.

2. A process for the preparation of a dialkyl ether/ethylene reaction product which comprises heating at a temperature between 50 and 250° C. and under ethylene pressure above 200 atmospheres a dialkyl ether free of olefinic unsaturation and a peroxy catalyst.

3. A process for the preparation of a dialkyl ether/ethylene reaction product which comprises heating under ethylene pressure above 200 atmospheres a dialkyl ether and benzoyl peroxide.

4. A process for the preparation of a diethyl ether/ethylene reaction product which comprises heating under ethylene pressure above 200 atmospheres a diethyl ether and a peroxy catalyst.

5. A wax-like product obtained by the process of claim 1 which contains a linear chain of at least 20 ethylene groups.

6. A wax-like product obtained by the process of claim 1 which contains at least 40 carbon atoms per molecule.

WILLIAM E. HANFORD.
JOHN R. ROLAND.

No references cited.

Certificate of Correction

Patent No. 2,457,229.  December 28, 1948.

WILLIAM E. HANFORD ET AL.

It is hereby certified that errors appear in the printed specification of the above numbered patent requiring correction as follows:

Column 3, line 34, for the word "patch" read *batch*; column 4, line 63, for "40–50° C." read *40–45° C.*;

and that the said Letters Patent should be read with these corrections therein that the same may conform to the record of the case in the Patent Office.

Signed and sealed this 3rd day of May, A. D. 1949.

[SEAL]

THOMAS F. MURPHY,
*Assistant Commissioner of Patents.*